(12) United States Patent
Wu

(10) Patent No.: US 6,658,271 B1
(45) Date of Patent: Dec. 2, 2003

(54) COMBINATION TOUCH PAD AND CELL OF CELLULAR PHONE AND THE PRODUCING METHOD THEREFOR

(75) Inventor: Shen-Yu Wu, Taipei (TW)

(73) Assignee: Inventec Corp., Taipei (TW)

( * ) Notice: Subject to any disclaimer, the term of this patent is extended or adjusted under 35 U.S.C. 154(b) by 511 days.

(21) Appl. No.: 09/658,026

(22) Filed: Sep. 8, 2000

(51) Int. Cl.[7] .............................. H04B 1/38; H04M 1/00
(52) U.S. Cl. ................. 455/573; 455/556.1; 455/556.2; 455/575.1; 455/550.1; 455/566; 345/157
(58) Field of Search ................................. 455/566, 556, 455/557, 572, 573, 575, 90, 550; 379/428.01, 428.02, 428.03, 428.04, 433.01, 433.04, 433.07, 433.08, 433.1, 433.12; 320/114, 115, 107; 178/18.03; 345/157, 173, 163, 167, 169

(56) References Cited

U.S. PATENT DOCUMENTS

| | | | | |
|---|---|---|---|---|
| 5,189,632 A | * | 2/1993 | Paajanen et al. | 708/109 |
| 6,219,037 B1 | * | 4/2001 | Lee | 345/167 |
| 6,243,080 B1 | * | 6/2001 | Molne | 345/173 |
| 6,369,798 B1 | * | 4/2002 | Yatsu et al. | 345/167 |
| 6,429,846 B2 | * | 8/2002 | Rosenberg et al. | 345/156 |

* cited by examiner

*Primary Examiner*—Dwayne Bost
*Assistant Examiner*—Temica M. Davis
(74) *Attorney, Agent, or Firm*—Bacon & Thomas, PLLC

(57) ABSTRACT

A combination touch pad and rechargeable cell of a cellular phone may be mounted in a recess of the cellular telephone for use as a data input and power source, and in addition may be mounted in a recess of a notebook computer for use as a data input while at the same recharging the battery. The notebook computer can therefore be used as an alternative recharger for the cellular telephone battery, while at the same enabling the cellular telephone to function as a PDA with touch pad input.

7 Claims, 3 Drawing Sheets

COMBINATION TOUCH PAD AND CELL OF CELLULAR PHONE AND THE PRODUCING METHOD THEREFOR

FIELD OF THE INVENTION

The present invention relates to a cellular phone and more particularly to a combination touch pad and a chargeable cell of a cellular phone and the producing method therefor with improved characteristics.

BACKGROUND OF THE INVENTION

A conventional cellular phone is shown in FIG. 1 comprising a housing 10 containing various electronics and circuit boards (not shown), a keypad 13 on the housing 10 for a user to input a telephone number and other characters, a liquid crystal display (LCD) 12 adjacent to the keypad 13 for showing telephone numbers, messages or the like, and a chargeable cell 11 on the other panel electrically connected to electronics and circuit boards.

In addition to the trend of slim size, the cellular phone has recently been combined with one or more popular electronic products to market as a multiple function product. For example, a cellular phone is combined with a personal digital assistant (PDA) to form a cellular phone having the features of a PDA. Similarly, a cellular phone is combined with a modem to form a cellular phone having the feature of accessing to the Internet. However, the slim size feature may be sacrificed due to the increase of hardware components while incorporating other features into the cellular phone. Thus, a need for improvements exists.

SUMMARY OF THE INVENTION

It is an object of the present invention to provide a combination touch pad and cell of a cellular phone such that a user may use the cellular phone by operating the touch pad, thereby enabling the cellular phone to have the hand writing input feature of a PDA.

It is another object of the present invention to provide a combination touch pad and notebook computer wherein a cell is mounted in a recess of the notebook computer such that the user may use the notebook computer by operating the touch pad while charging the cell through the notebook computer, thereby providing another option for charging the cell.

It is still another object of the present invention to provide a touch pad which is capable of being mounted in a cellular phone of notebook computer such that the user may use the cellular phone of notebook computer by operating the touch pad, resulting in a reduction in the manufacturing cost of both the cellular phone and the notebook computer by providing the touch pad as a common component.

The above and other objects, features and advantages of the present invention will become apparent from the following detailed description taken with the accompanying drawings.

DETAILED DESCRIPTION OF THE PREFERRED EMBODIMENTS

Figure 1:
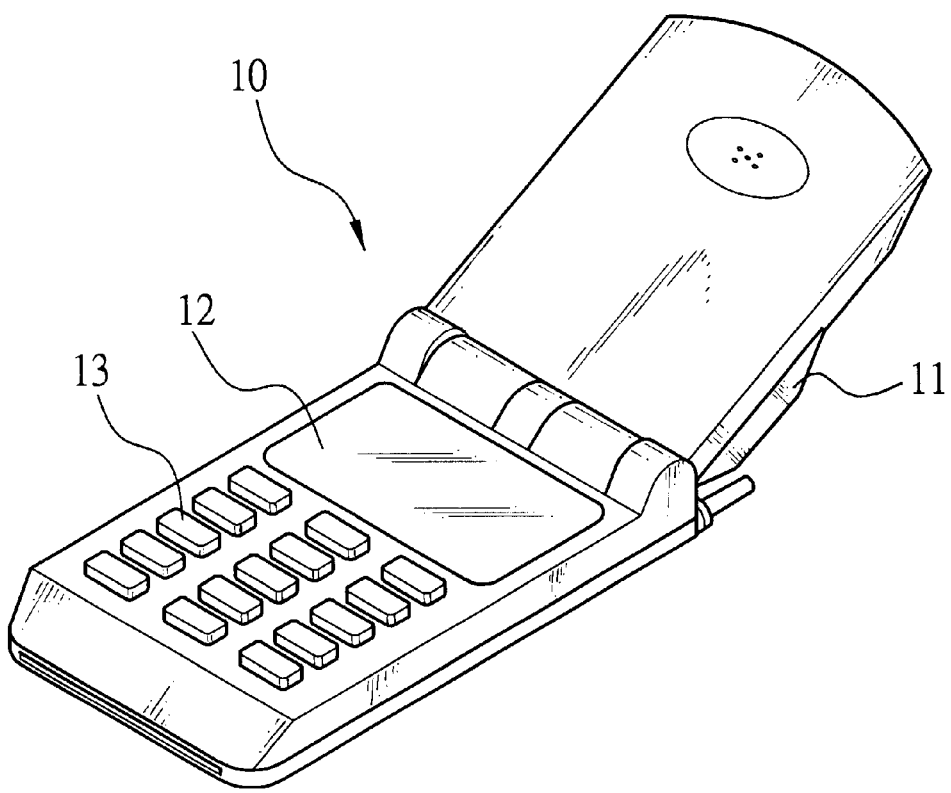
FIG. 1 is a perspective view of a conventional cellular phone.
Figure 2:
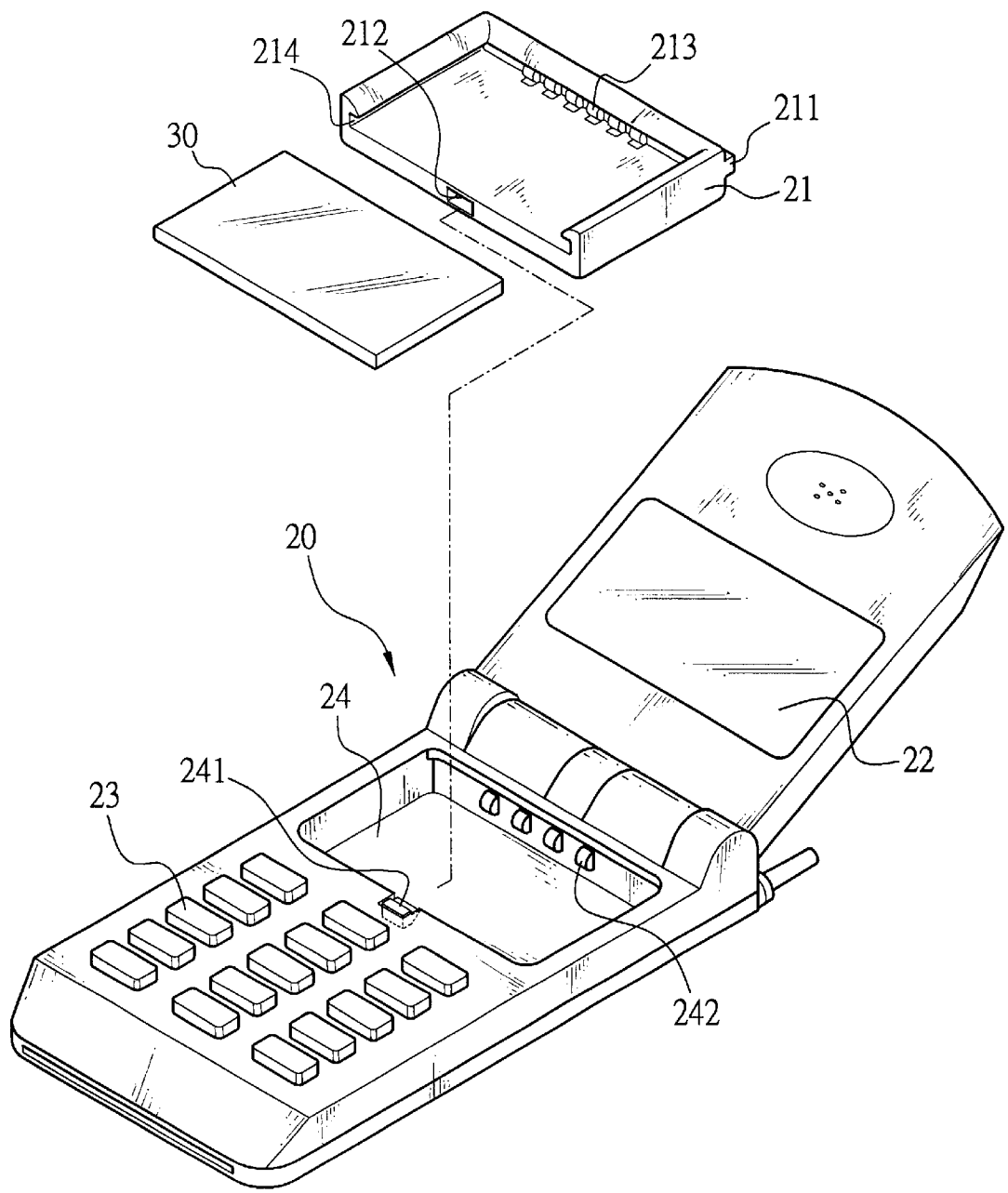
FIG. 2 is an exploded perspective view of a first preferred embodiment of combination touch pad and cell mounted on a cellular phone according to the invention.
Figure 3:
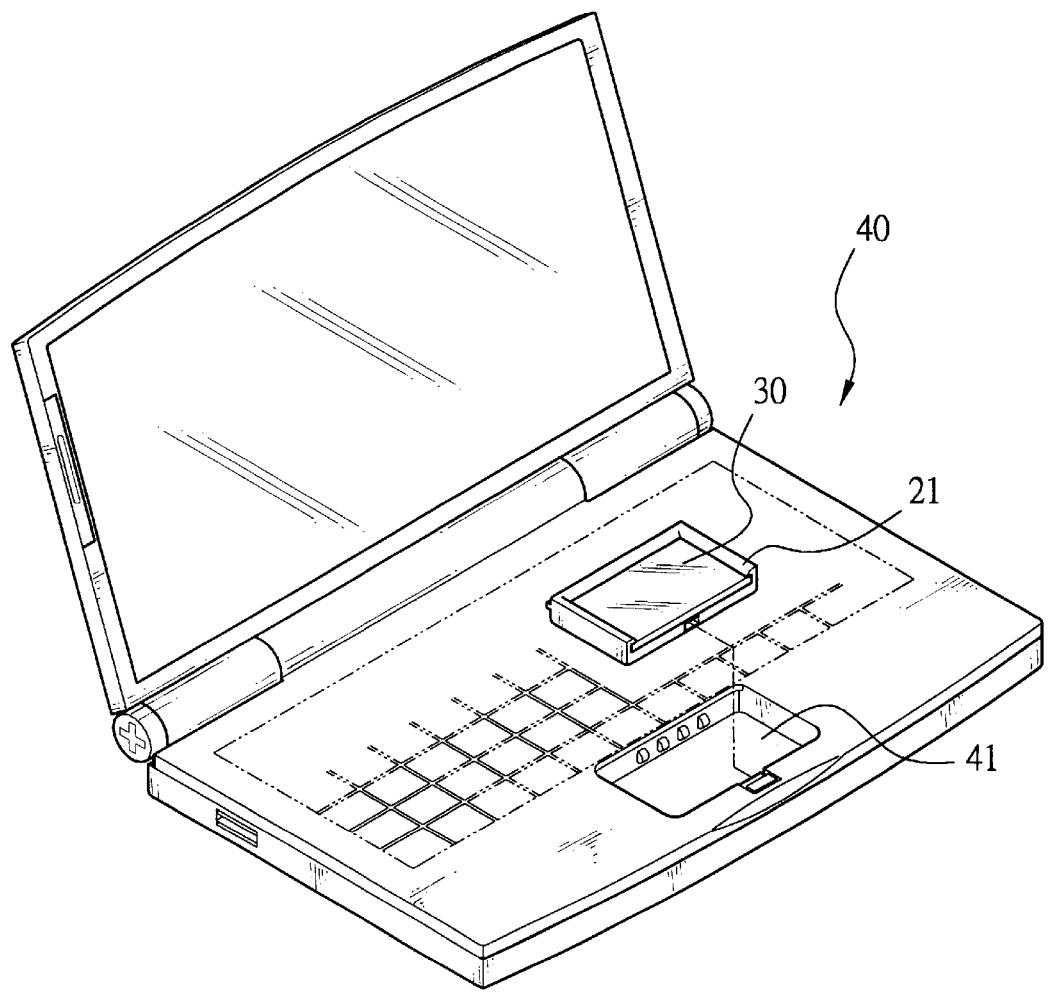
FIG. 3 is an exploded perspective view of a second preferred embodiment of combination touch pad and cell mounted on a notebook computer according to the invention.

Referring to FIGS. 2 and 3, there is shown a combination touch pad and cell mounted on a cellular phone and notebook computer respectively. In FIG. 3, touch pad 30 is mounted in a side of cell 21 as a whole, and then mounted in a recess 41 of notebook computer 40. This combination serves as a touch pad for user operation. At the same time, cell 21 is being charged by notebook computer 40. Cell 21 can be removed from notebook computer 40 and mounted in recess 24 of cellular phone 20 after being charged. The power of cellular phone 20 is provided by cell 21. Likewise, the user may use cellular phone 20 by operating touch pad 30 (FIG. 2).

Referring to FIG. 2 specifically, cell 21 is a generally rectangular recessed member comprising a flange 211 projected outwardly on the rear, a slot 212 on the center of front side, a plurality of signal contacts 213 on the rear adjacent to the flange 211, and two opposite side grooves 214. In assembly, first insert touch pad 30 from the front of cell 21 until in place wherein two sides of touch pad 30 are fastened by grooves 214 and a plurality of signal contacts (not shown) of the touch pad 30 on the rear are engaged with signal contacts 213 for effecting a signal communication between touch pad 30 and cell 21. Then mount both touch pad 30 and cell 21 into recess 24 of cellular phone 20 wherein tab 241 on the front side of recess 24 is engaged with slot 212 and a plurality of contacts 242 on the rear of recess 24 are engaged with flange 211 such that a plurality of contacts (not shown) of cell 21 on the flange 211 are in communication with contacts 242. Touch pad 30 and cell 21 are secured in recess 24 of cellular phone 20 now. Further, cell 21 can provide an electricity to cellular phone 20. Furthermore, touch pad 30 is operable to be in signal communication with cellular phone 20 through the above contacts.

In one aspect of the invention, touch pad 30 and cell 21 are combined prior to mounting in cellular telephone 20. As such, the user may use cellular phone 20 by operating touch pad 30, thereby enabling cellular phone 20 to have the hand writing input feature of a PDA. Further, messages are shown on Lcd 22 of cellular phone 20.

User may press tab 241 to remove cell 21 from recess 24 after cell 21 is charged. Referring to FIG. 3 specifically, then mount both cell 21 and touch pad 30 in recess 41 of notebook computer 40. At this time, touch pad 30 can be used as input device of notebook computer 40 when user operates notebook computer 40. At the same time, cell 21 is being charged by the notebook computer 40.

In view of the foregoing, the invention has the advantages of providing another option for charging the chargeable cell of a cellular phone and reducing the manufacturing cost of both the cellular phone and a notebook computer by providing the touch pad as a common component. As a result, a traveler carrying a cellular phone and notebook computer may use the notebook computer by operating the touch pad which is together with the cell and is mounted in the notebook computer while charging the cell through the notebook computer. With this, the inhibition of charging when forgetting to carry a charger while travelling is lifted because, as stated above, the notebook computer also serves as a charger.

While the invention herein disclosed has been described by means of specific embodiments, numerous modifications and variations could be made thereto by those skilled in the art without departing from the scope and spirit of the invention set forth in the claims.

What is claimed is:

1. A method for producing a combination of a touch pad and a rechargeable cell of a cellular phone, comprising the steps of:

assembling the touch pad in a predetermined position on the surface of the cell;

mounting the assembled touch pad and cell in a recess of a notebook computer;

charging the cell through the notebook computer while operating notebook computer through the touch pad;

mounting the assembled touch pad and cell in a recess of the cellular phone;

providing electricity from the rechargeable cell to the cellular phone; and operating the cellular phone through the touch pad.

2. A combination, comprising:

a recessed rechargeable cell of a cellular phone including a plurality of first signal contacts on the rear and two opposite side grooves;

a touch pad including a plurality of signal contacts on the rear of the touch pad, wherein the sides of the touch pad are fastened by the grooves and the signal contacts of the touch pad are engaged with the first signal contacts of the cell for effecting a signal communication between the touch pad and the cell, wherein the touchpad is arranged to enable operation of the cellular phone through the touchpad while the cell supplies electricity to the cellular phone, and wherein the touchpad is also arranged to enable operation of a notebook computer through the touchpad while the cell recharges through the notebook computer.

3. The combination of claim 2, wherein the cellular phone includes a recess and the cell further includes a flange projecting outwardly from the rear of the cell and engaged with the rear of the recess of the cellular phone when the cell is mounted in the recess of the cellular phone.

4. The combination of claim 3, wherein the cell further includes a slot on the front side and the cellular phone further includes a tab inserted into and secured in the slot when the cell is mounted in the recess of the cellular phone.

5. The combination of claim 3, wherein the cell further includes a plurality of second signal contacts adjacent the first signal contacts and the cellular phone further includes a plurality of signal contacts at the rear of the recess of the cellular phone, said second signal contacts being in electrical and signal communications with the cellular phone through engagement of the second signal contacts of the cell and the signal contacts of the cellular phone.

6. The combination of claim 2, wherein the notebook computer has a recess for receiving the touch pad and cell, with the touch pad and the cell received in the recess of the notebook computer serving as an input device of the notebook computer.

7. The combination of claim 6, wherein the cell is charged by the notebook computer when the cell is received in the recess.

* * * * *